United States Patent
Seacat Deluca et al.

(10) Patent No.: US 9,104,865 B2
(45) Date of Patent: Aug. 11, 2015

(54) THREAT CONDITION MANAGEMENT

(71) Applicant: International Business Machines Corporation, Armonk, NY (US)

(72) Inventors: Lisa Seacat Deluca, Baltimore, MD (US); Lydia M. Do, Raleigh, NC (US); Charles M. Kinard, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 14/014,034

(22) Filed: Aug. 29, 2013

(65) Prior Publication Data

US 2015/0067865 A1   Mar. 5, 2015

(51) Int. Cl.
G06F 21/55 (2013.01)
(52) U.S. Cl.
CPC .................................... *G06F 21/554* (2013.01)
(58) Field of Classification Search
CPC combination set(s) only.
See application file for complete search history.

(56) References Cited

U.S. PATENT DOCUMENTS

| | | | |
|---|---|---|---|
| 7,809,353 B2 | 10/2010 | Brown et al. | |
| 8,095,150 B2 | 1/2012 | Dunko | |
| 2011/0141276 A1* | 6/2011 | Borghei | 348/143 |

FOREIGN PATENT DOCUMENTS

WO   2012093393   7/2012

OTHER PUBLICATIONS

IBM, "IBM Endpoint Manager," ibm.com, retrieved Aug. 29, 2013, 4 pages, <www-01.ibm.com/software/tivoli/solutions/endpoint-manager/?s_pkg=bfwm>.
Raju PP, "1—Ways to Track and Recover your Lost/Stolen iPhone," TechnologyPersonalized, techpp.com, retrieved Aug. 29, 2013, 11 pages, <techpp.com/2009/09/18/6-ways-to-find-lost-stolen-ipone-free/>.
Tasker Wiki, "Profiles," tasker.wikidot.com, Jun. 10, 2013, 3 pages, <tasker.wikidot.com/profile-index>.
Technorms, "Top 6 Android Apps to Locate a Lost or Stolen Phone," www.technorms.com, retrieved Aug. 29, 2013, 13 pages, <www.technorms.com/10861/best-android-apps-locate-lost-missing-phone>.

* cited by examiner

*Primary Examiner* — Beemnet Dada
(74) *Attorney, Agent, or Firm* — Jordan IP Law, LLC (57) ABSTRACT

Methods, products, apparatuses, and systems may manage a threat condition. A plurality of triggers may be identified over a period of time. Each of the triggers may be associated with a threat risk value. An accumulation value may be determined based on an aggregation of each threat risk value over the period of time. A set of progressive threshold values associated with a set of progressive threat conditions may be defined. A threat condition from the set of threat conditions may be established for the device based on the accumulation value. The threat condition may be managed, for example by defining an operational mode for the device, in response to the threat condition.

16 Claims, 4 Drawing Sheets

THREAT CONDITION MANAGEMENT

BACKGROUND

Embodiments of the present invention generally relate to managing a threat condition. More particularly, embodiments relate to identifying a plurality of triggers over a period of time associated with a threat risk value and determining an accumulation value based on an aggregation of the threat risk values, wherein a threat condition may be established based on the accumulation value and the threat condition may be managed by defining an operational condition.

The management of a threat condition for a device may involve an extreme binary security response, such as immediately locking the device when an error is identified (e.g., failed login attempt). In addition, a request to the device from a user may be required to manage the threat condition. Moreover, a response to a security prompt (e.g., request to enter a password) by the user may be required to reverse the security response. Accordingly, the user may experience delay and/or inconvenience when managing a threat condition.

BRIEF SUMMARY

Embodiments may include a method involving identifying a plurality of triggers including a suspicion trigger and a calming trigger over a period of time, wherein each of the triggers are to be associated with a threat risk value. The method may include determining an accumulation value based on an aggregation of each threat risk value over the period of time. In addition, method may include defining a set of progressive threshold values to be associated with a set of progressive threat conditions, wherein a threat condition from the set is to be established for the device based on the accumulation value. The method may include managing the threat condition, wherein an operational mode for a device is to be defined in response to the threat condition Embodiments may include a method involving identifying a plurality of triggers over a period of time, wherein the plurality of triggers include a suspicion trigger to indicate suspicious activity for a device and a calming trigger to indicate calming activity for the device, and wherein each of the triggers are associated with a threat risk value. The method may include determining an accumulation value based on an aggregation of each threat risk value over the period of time, wherein the threat risk value includes a departure risk value causing the accumulation value to depart from a safe condition value stored and a reversion risk value causing the accumulation value to revert towards the safe condition value. In addition, the method may include defining a set of progressive threshold values associated with a set of progressive threat conditions, wherein a threshold value from the set includes one or more of a moderate threshold value and an elevated threshold value, and wherein a threat condition from the set is established for the device based on the accumulation value. The method may also include managing the threat condition by defining an operational mode for the device in response to the threat condition.

The method may include determining a correlation among two or more of the triggers and/or applying a weight factor to the accumulation value based on the correlation. The method may include determining a transition across the threshold value from the set by the accumulation value to establish the threat condition and/or modifying the threshold value from the set based on a risk profile, wherein the risk profile accounts for a device used, a usage context, and/or a usage location. The method may include maintaining a current operational mode when a threshold value is not crossed and/or modulating the current operational mode when the threshold value is crossed, wherein the current operational mode includes a fully operational mode, a partially operational mode, and/or a fully inoperable mode. The method may include setting the accumulation value to be a limit value independently of a previous value of the accumulation value and/or setting the accumulation value when a trigger persists for a time duration.

Embodiments may include a computer program product having a computer readable storage medium and computer usable code stored on the computer readable storage medium. If executed by a processor, the computer usable code may cause a computer to identify a plurality of triggers over a period of time, wherein each of the triggers are to be associated with a threat risk value. The computer usable code, if executed, may also cause a computer to determine an accumulation value based on an aggregation of each threat risk value over the period of time. The computer usable code, if executed, may also cause a computer to define a set of progressive threshold values to be associated with a set of progressive threat conditions, wherein a threat condition from the set is to be established for the device based on the accumulation value. The computer usable code, if executed, may also cause a computer to manage the threat condition, wherein an operational mode for a device is to be defined in response to the threat condition.

Embodiments may include a computer program product having a computer readable storage medium and computer usable code stored on the computer readable storage medium. If executed by a processor, the computer usable code may cause a computer identify a plurality of triggers over a period of time, wherein the plurality of triggers are to include a suspicion trigger to indicate suspicious activity for a device and a calming trigger to indicate calming activity for the device, and wherein each of the triggers are to be associated with a threat risk value. The computer usable code, if executed, may also cause a computer to determine an accumulation value based on an aggregation of each threat risk value over the period of time, wherein the threat risk value is to include a departure risk value to cause the accumulation value to depart from a safe condition value and a reversion risk value to cause the accumulation value to revert towards the safe condition value. The computer usable code, if executed, may also cause a computer to define a set of progressive threshold values to be associated with a set of progressive threat conditions, wherein a threshold value from the set is to include one or more of a moderate threshold value and an elevated threshold value, and wherein a threat condition from the set is to be established for the device based on the accumulation value. The computer usable code, if executed, may also cause a computer to manage the threat condition, wherein an operational mode for the device is to be defined in response to the threat condition.

The computer usable code, if executed, may also cause a computer to determine a correlation among two or more of the triggers and/or apply a weight factor to the accumulation value based on the correlation. The computer usable code, if executed, may also cause a computer to determine a transition across the threshold value from the set by the accumulation value to establish the threat condition and/or modify the threshold value from the set based on a risk profile, wherein the risk profile is to account for a device to be used, a usage context, and/or a usage location. The computer usable code, if executed, may also cause a computer to maintain a current operational mode when a threshold value is not crossed and/or modulate the current operational mode when the threshold value is crossed, wherein the current operational mode includes a fully operational mode, a partially operational mode, and/or a fully inoperable mode. The computer usable code, if executed, may also cause a computer to set the accumulation value to be a limit value independently of a previous value of the accumulation value and/or to set the accumulation value when a trigger is to persist for a time duration.

Embodiments may include an apparatus including a processor to identify a plurality of triggers over a period of time, wherein each of the triggers are to be associated with a threat risk value. The apparatus may include a processor to determine an accumulation value based on an aggregation of each threat risk value over the period of time. The apparatus may include a processor to define a set of progressive threshold values to be associated with a set of progressive threat conditions, wherein a threat condition from the set is to be established for the device based on the accumulation value. The apparatus may include a processor to manage the threat condition, wherein an operational mode for a device is to be defined in response to the threat condition.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
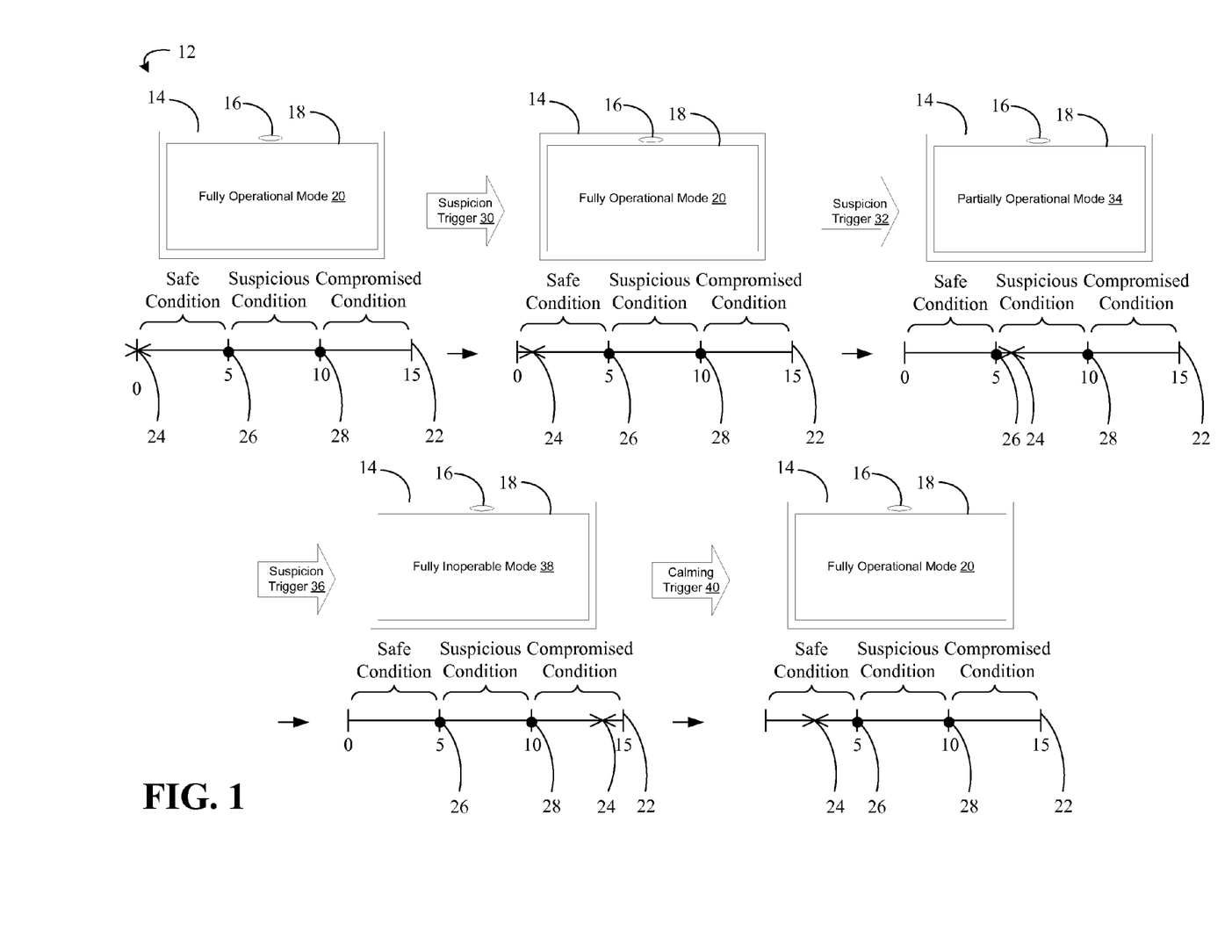
FIG. 1 is a block diagram of an example of a scheme to manage a threat condition according to an embodiment.

Referring now to FIG. 1, a scheme 12 is shown to manage a threat condition according to an embodiment. The illustrated scheme 12 includes a device 14, which may include any platform. In one example, the platform may include a mobile computing platform such as a smart phone, a notebook, a tablet, and so on, or combinations thereof. In another example, the platform may include a fixed computing platform, such as a desktop computer, a server, an automatic transfer machine, a kiosk, a gaming console, and so on, or combinations thereof. The illustrated device 14 includes an image capture device 16 (e.g., a camera) and a display 18 (e.g., a touchscreen). Accordingly, the device 14 may include a sensor, such as the image capture device 16 (e.g., a two-dimensional camera, a three-dimensional camera, etc.), the display 18 (e.g., a capacitive touch screen, a resistive touch screen, etc.), a global positioning system (GPS), an accelerometer, a gyroscope, a microphone, a communication interface (e.g., WiFi, Bluetooth, Cellular, etc.) and so on, or combinations thereof. In the illustrated example, a fully operational mode 20 is defined for the device 14, wherein no functional capability of the device 14 is to be limited, suspended, and so on, or combinations thereof.

The illustrated scheme 12 may also include a risk assessment tool 22. The risk assessment tool may include any data structure format. For example, the risk assessment tool 22 may include a database table. The database table may include any arrangement (e.g., combinations, locations, etc.) of any element described herein, such as a trigger, a threat risk value, an accumulation value, a threshold value, a threat condition, an operational capability, a correlation, a security action, a usage pattern, and so on, or combinations thereof. In one example, a counter may be implemented to update an element of the database table, such as the accumulation value, and so on. For the purpose of illustration, the risk assessment tool 22 includes a graduated one-dimensional Cartesian coordinate scale having a positive coordinate (e.g., 0 to 15 in one axis). It should be understood that any scale may be utilized, including a one-dimensional Cartesian coordinate scale having a negative coordinate and a positive coordinate (e.g., −15 to 15 in one axis), a three-dimensional Cartesian coordinate scale having coordinates in three dimensions (e.g., X, Y, Z coordinates), a Polar coordinate scale having a radial coordinate and an angular coordinate, and so on, or combinations thereof.

In the illustrated example, the fully operational mode 20 is defined for the device 14. For example, the device 14 may be newly deployed, a counter may be reset and/or reflect a specific value associated with the fully operational mode 20, the device 14 may be held by an owner (e.g., administrator, purchaser, assigned user, etc.) where no threat has been perceived by the device 14, and so on, or combinations thereof. Accordingly, a current user may utilize the device 14 to leverage the full functional capabilities of the device 14. A plurality of triggers may be identified over a period of time, such as minutes, days, weeks, and so on, or combinations thereof. The plurality of triggers may include a suspicion trigger to indicate suspicious activity for the device 14. The suspicion trigger may be generated and/or implemented automatically, for example independently of a request (e.g., from the owner, etc.) for a security status related to the device 14. For example, the suspicion trigger may be generated automatically in response to a departure from an established usage pattern. The established usage pattern may include a geospatial travel pattern, a geospatial location pattern, a device handling pattern, a communication pattern, a short message service pattern, an audio pattern, a user recognition pattern, and so on, or combinations thereof.

In one example, the GPS system of the device 14 may be utilized to indicate that the device 14 is deviating from an established (e.g., normal, typical, usual, etc.) geospatial travel area and/or geospatial travel route (e.g., an established travel route for a work day, an established travel route for a leisure day, an established travel route for a time of day, etc.), that the device 14 is deviating from an established geospatial location (e.g., an established location for a work day, an established location for a leisure day, an established location for a time of day, etc.), and so on, or combinations thereof. In another example, the communication interface of the device 14 may be utilized to indicate that the device 14 is deviating from an established communication pattern, such as a type and/or frequency of incoming call (e.g., public switched telephone network calls, voice over internet protocol calls, etc.), a type and/or frequency of incoming messages (e.g., instant messages, electronic mail messages, short message service text, etc.), a type and/or frequency of outgoing calls, a type and/or frequency of outgoing messages, a connection with a device such as a Bluetooth device (e.g., a Bluetooth ear bud, a Bluetooth keypad, a Bluetooth mouse, etc.), a connection with a network such as a WiFi network (e.g., a WiFi hotspot, etc.), a connection with a cellular carrier (e.g., a telecommunications provider), and so on, or combinations thereof.

The accelerometer and/or the gyroscope of the device 14 may be utilized to indicate that the device 14 is deviating from an established device handling pattern, such as a gait of a walk of the current user when the user possesses the device 14 (e.g., when in the user's hands, when in a pocket, etc.), the manner in which the device 14 is treated by the user (e.g., rough, gentile, etc.), the manner in which the device 14 is held (e.g., right handed, left handed, in a pocket, in a purse, etc.), and so on, or combinations thereof. In one example, a combination of GPS data and accelerometer data may be utilized to indicate that the device 14 is deviating from an established hybrid pattern, such as a hybrid leisure activity pattern (e.g., current pattern including running in a park rather than an established pattern of walking in a park, etc.), a hybrid work pattern (e.g., current pattern including being carried at high speed in an automobile during work hours rather than an established pattern of no high speed acceleration during work hours, etc.). The microphone of the device 14 may be utilized to indicate that the device 14 is deviating from an established audio pattern, such as a proximity of a voice to the device 14, background noise, and so on, or combinations thereof.

The microphone of the device 14 may also be utilized to indicate that the device 14 is deviating from an established user recognition pattern, such as a pitch of a voice, a tone of the voice, linguistics, phonetics, and so on, or combinations thereof. The image capture device 16 may also be utilized to indicate that the device 14 is deviating from an established user recognition pattern, such as an image of the user (e.g., facial recognition, eye recognition, etc.), an image of the surroundings, and so on, or combinations thereof. The display 18 may also be utilized to indicate that the device 14 is deviating from an established user recognition pattern, such as a finger print pattern, a palm print pattern, and so on, or combinations thereof. In one example, the microphone, the image capture device 16, and/or the display 18 may be utilized without causing the current user of the device 14 to become aware (e.g., to silently collect data) of the data collection. For example, the display 18 may silently (e.g., unintrusively) collect a finger print scan and/or palm print scan when the user is holding the device 14 without causing the user to become aware that the scan is executed.

Is should be understood that the suspicion trigger may indicate any suspicious activity and/or may be generated in response to a departure from any established pattern. For example, the suspicion trigger may be generated in response to a deviation from an application pattern (e.g., applications used), a music pattern (e.g., music requested), a video pattern (e.g., videos requested), and so on, or combinations thereof. Accordingly, any unusual usage of the device 14 (e.g., unusual media content pattern) may generate suspicion. It should also be understood that any sensor may provide data to generate and/or implement any trigger, such as a climate sensor to provide temperature data, weather data, and so on, or combinations thereof. Moreover, it should be understood that the device 14 may implement any unintrusive operation, such as silently forwarding any data to any party (e.g., forwarding the finger print scan to law enforcement, a current location to the owner, a photograph of the current user, etc.).

The plurality of triggers may also include a calming trigger to indicate calming activity for the device 14. The calming trigger may be generated and/or implemented automatically, for example independently of a security prompt (e.g., a password test, etc.) to the current user of the device 14. In one example, the calming trigger may be generated based on a disappearance of the suspicion trigger. The suspicion trigger may, for example, be implemented as the calming trigger if the suspicion trigger disappears for a preset amount of time to indicate stability for the device 14. For example, the GPS sensor of the device 14 may be utilized to indicate that the device 14 is in an established geospatial travel pattern for thirty minutes before the suspicion trigger may be implemented as the calming trigger. The suspicion trigger may be implemented as the calming trigger, for example, by causing an opposite effect which may be caused by the suspicion trigger (e.g., subtract points where the effect of the suspicion trigger is to add points, etc.). In addition, the effect of the suspicion trigger may be held (e.g., do not add points immediately, etc.) for the preset amount of time, the suspicion trigger may be implemented immediately to cause the effect which may be subsequently countered when the suspicion trigger is implemented as the calming trigger, and so on, or combinations thereof.

In another example, the calming trigger may be generated and/or implemented automatically based on an encounter of the calming activity, such as a reversion towards an established usage pattern, such as the geospatial travel pattern, the geospatial location pattern, the device handling pattern, the communication pattern, the short message service pattern, the audio pattern, the user recognition pattern, the application usage pattern, the music usage pattern, and so on, or combinations thereof. For example, the GPS sensor of the device 14 may be utilized to indicate that the device 14 is in (e.g., reverted back to, etc.) an established geospatial travel pattern, the microphone of the device 14 may be utilized to indicate that the proximity of the voice to the device 14 matches (e.g., reverted back to, etc.) an established proximity pattern of the owner, and so on, or combinations thereof. It should be understood that while the calming activity may include a response to a security prompt (e.g., a password in response to a test, etc.), it is not a required calming trigger for the management of the threat condition. Indeed, the calming trigger may dynamically counteract the effect of the suspicion trigger for the device 14, and vice versa, independently of a security status request, a prompt, and so on, or combinations thereof. The plurality of triggers may, for example, be generated and/ or implemented silently, synchronously, noninvasively, unintrusively (as desired), and so on, or combinations thereof.

Each of the triggers may be associated with a threat risk value. The threat risk value may include any value format, such as a relative threat risk value, a numerical threat risk value, and so on, or combinations thereof. In one example, the relative threat risk value may include the value "low", "medium", "high", and so on, or combinations thereof. In another example, the numerical threat risk value may include a negative integer (e.g., −1 point, −2 points, −30 degrees, etc.), a positive integer, (e.g., 1 point, 2 points, 30 degrees, etc.), and so on, or combinations thereof. In the illustrated example, the suspicion trigger includes a departure risk value defined by a positive integer (e.g., a positive point value) and the calming trigger includes a reversion risk value defined by a negative integer (e.g., a negative point value), which may be based on the format of the risk assessment tool 22 (e.g., a one-dimensional Cartesian scale starting at the value zero and ending at the value fifteen).

An accumulation value 24 may be determined based on an aggregation of each threat risk value over a period of time. Accordingly, the accumulation value 24 may include any value format, such as a relative accumulation value, a numerical accumulation value, and so on, or combinations thereof. In one example, the relative accumulation value may include the value "low", "medium", "high", and so on, or combinations thereof. In another example, the numerical accumulation value may include a negative integer (e.g., −1 point, −2 points, −30 degrees, etc.), a positive integer, (e.g., 1 point, 2 points, 30 degrees, etc.), and so on, or combinations thereof. The aggregation may include a sum, an average, a mean, a maximum, a minimum, first, last, standard deviations, and so on, or combinations thereof. In the illustrated example, the accumulation value 24 is determined to be the integer value zero (0). A counter may be maintained for the accumulation value 24, for example in data storage, data memory, and so on, or combinations thereof. Accordingly, the counter may read zero (0) in the illustrated example. It should be understood that the accumulation value 24 may include a range of values, a single value (as illustrated), and so on, or combinations thereof.

The accumulation value 24 may be adjusted by each threat risk value, for example via the aggregation thereof. The accumulation value 24 may also be modified by a weight factor. In one example, the weight factor may be based on a correlation among two or more of the triggers. For example, triggers may correlate in temporal scope (e.g., occurring within a minute, an hour, etc.), in geographic scope (e.g., an unusual WiFi hotspot within an unusual geospatial travel path, etc.), in usage scope (e.g., left hand rough usage, right hand gentile usage, etc.), in recognition scope (e.g., facial image mismatch, voice pitch mismatch, etc.), in type scope (e.g., suspicion, calming, etc.). In one example, multiple correlating suspicion triggers may cause a multiplication weight factor to be applied to modify the accumulation value 24 instead of, for example, merely adding the threat risk values since the correlation indicates relatively greater confidence than a single suspicion trigger. In another example, multiple correlating calming triggers may cause a multiplication weight factor to be applied to modify the accumulation value 24 instead of, for example, merely subtracting the threat risk values since the correlation indicates relatively greater confidence than a single calming trigger.

In the illustrated example, a set of progressive threshold values 26, 28 are defined, which may be based on the format of the risk assessment tool 22. The threshold values 26, 28 may include any value format, such as a relative threshold value, a numerical threshold value, and so on, or combinations thereof. In one example, the relative threshold value may include the value "minimal", "moderate", "elevated", and so on, or combinations thereof. In another example, the numerical threshold value may include a negative integer (e.g., −1 point, −2 points, −30 degrees, etc.), a positive integer, (e.g., 1 point, 2 points, 30 degrees, etc.), and so on, or combinations thereof. In the illustrated example, the threshold value 26 includes a moderate threshold value and the threshold value 28 includes an elevated threshold value, wherein the threshold value 26 is defined by a positive integer value five (5) and the threshold value 28 is defined by a positive integer value ten (10). The threshold values 26, 28 may be progressive since they may include the same units (e.g., points), may be graduated, may be hierarchical, may be successive, and so on, or combinations thereof. It should be understood that the threshold values 26, 28 may include a range of values, a single value (as illustrated), and so on, or combinations thereof. It should also be understood that any number of incremental threshold values may be implemented.

The illustrated threshold values 26, 28 may be modified at any time. For example, the threshold values 26, 28 may be modified based on a risk profile. In one example, the risk profile may account for a device to be used. The risk profile may define, for example, that a mobile platform may be considered to be at a higher security risk relative to a fixed platform, a smart phone may be considered to be at higher risk relative to a standalone camera, and so on, or combinations thereof. In another example, the risk profile may account for a usage context. The risk profile may define, for example, that a work platform used for employment activities may be considered to be at higher risk relative to a personal platform used for leisure activities, a notebook used primarily for non-gaming activities may be considered to be at higher risk relative to a gaming console used primarily for gaming activities, and so on, or combinations thereof. The risk profile may also account for a usage location. The risk profile may define, for example, that a platform used in a secure location (e.g., home, office, etc.) may be considered at lower risk relative to a public location (e.g., a coffee store, a shopping plaza, etc.), and so on. Accordingly, the threshold values 26, 28 may be modified based on the risk profile (e.g., increase values for a mobile platform, decrease values for a fixed platform, etc.).

In the illustrated example, the set of progressive threshold values 26, 28 are associated with a set of progressive threat conditions. The threat conditions may be defined by any value format, such as a relative threat condition value, a numerical threat condition value, and so on, or combinations thereof. In one example, the relative threat condition value may include the value "safe", "undetermined", "suspicious", "compromised", "lost", "stolen", and so on, or combinations thereof. In another example, the numerical threat condition value may include a negative integer (e.g., −1 point, −2 points, −30 degrees, etc.), a positive integer, (e.g., 1 point, 2 points, 30 degrees, etc.), and so on, or combinations thereof. In the illustrated example, the set of progressive threat conditions includes a safe condition, a suspicion condition, and a compromised condition (which may include a lost condition and/or a stolen condition), wherein the safe condition is defined by a positive integer value region from a limit value (e.g., boundary) of the risk assessment tool (e.g., zero) to the threshold value 26 (e.g., five), wherein the suspicious condition is defined by a positive integer value region from the threshold value 26 (e.g., five) to the threshold value 28 (e.g., ten), and wherein the compromised condition is defined by a positive integer value region from the threshold value 28 (e.g., ten) to another limit value (e.g., boundary) of the risk assessment tool 22 (e.g., fifteen).

Accordingly, the threshold value 26 (e.g., a moderate threshold value five) may separate the safe condition value region and the suspicious condition value region. In addition, an elevated threshold value (e.g., an elevated threshold value of ten) may separate the suspicious condition value region and one or more of a lost condition value region and a stolen condition value region. Moreover, the threat conditions may be progressive since they may include the same units (e.g., points), may be graduated, may be hierarchical, may be successive, and so on, or combinations thereof. It should be understood that the threat conditions may include a range of values (as illustrated), a single value, and so on, or combinations thereof. It should also be understood that any number of threat conditions may be implemented.

In the illustrated example, a suspicion trigger 30 is encountered. The suspicion trigger 30 includes a departure risk value to cause the accumulation value 24 to depart from a safe condition value zero (0) to another safe condition value one (1). The magnitude of the departure may be predetermined (e.g., configured, preset, etc.), may be based on a severity ascribed to the suspicion trigger 30, and so on, or combinations thereof. For example, the threat risk value associated with the suspicion trigger 30 is a positive integer value one (1) in the illustrated example, which may be predetermined for the suspicion trigger 30 to indicate relatively unimportant security activity (e.g., a relatively minor deviation from an established travel path, a new Bluetooth device, etc.). Accordingly, the threat risk value associated with the suspicion trigger 30 may be added to the accumulation value 22, which causes the accumulation value 22 to depart from a safe condition value zero (0) to a safe condition value one (1). In addition, the counter maintaining the accumulation value 22 may be updated to read one (1).

The threat condition for the device 14 may be established based on the accumulation value 24. In the illustrated example, the threat condition may be established as the safe condition. For example, the absence of a transition across the threshold values 26, 28 may be determined based on the change in value of the accumulation value 24, based on the final total value of the accumulation value 24, based on the appearance of the accumulation value 24 in the safe condition value region, and so on, or combinations thereof. In the illustrated example, the threat condition is established as the safe condition since the accumulation value 24 has not crossed the threshold values 26, 28 and remains in the safe condition value region. The safe threat condition may be managed by defining an operational mode for the device 14 in response to the safe threat condition. For example, a security action may be performed to define the operational mode. The security action may include, for example, maintaining the current operational mode, modulating the current operational mode, and so on, or combinations thereof. In the illustrated example, the operational mode is maintained and defined as the fully operational mode 20.

A suspicion trigger 32 is encountered in the illustrated example. The suspicion trigger 32 includes a departure risk value to cause the accumulation value 24 to depart from a safe condition value one (1) to a suspicious condition value six (6). The magnitude of the departure may be predetermined (e.g., configured, preset, etc.), may be based on a severity ascribed to the suspicion trigger 32, and so on, or combinations thereof. For example, the threat risk value associated with the suspicion trigger 32 is a positive integer value five (5) in the illustrated example, which may be predetermined for the suspicion trigger 32 to indicate moderately severe security activity (e.g., a moderately severe deviation from an established travel path, a deviation from a work pattern, etc.). Accordingly, the threat risk value associated with the suspicion trigger 32 may be added to the accumulation value 24, which causes the accumulation value 24 to depart from a safe condition value one (1) to a suspicion condition value six (6). In addition, the counter maintaining the accumulation value 24 may be updated to six (6). Accordingly, multiple triggers, such as the suspicion triggers 30, 32, may be sufficient to cross a threshold such as the threshold values 26.

The threat condition for the device 14 may be established based on the accumulation value 24. In the illustrated example, the threat condition may be established as the suspicious condition, wherein a transition across only the threshold value 26 is determined based on the accumulation value 24. For example, a transition across only the threshold value 26 may be determined based on the change in value of the accumulation value 24, based on the final total value of the accumulation value 24, based on the appearance of the accumulation value 24 in the suspicious condition value region, and so on, or combinations thereof. In the illustrated example, the threat condition is established as the suspicious condition since the accumulation value 24 has only crossed the threshold value 26 and remains in the suspicious condition value region. The suspicious threat condition may indicate, for example, that the device 14 is perceived to be at a relatively modest risk of being compromised, such as hacked, lost, stolen, and so on, or combinations thereof.

The suspicious threat condition may be managed by defining an operational mode for the device 14 in response to the suspicious threat condition. For example, a security action may be performed to define the operational mode. The security action may include, for example, maintaining the current operational mode, modulating the current operational mode, and so on, or combinations thereof. In the illustrate example, the operational mode is defined as a partially operational mode 34. In one example, the fully operational mode 20 may be modulated (e.g., changed) to the partially operational mode 34 since the accumulation value 24 transitions across only the threshold value 26 to establish the suspicious threat condition.

There may be a limit on a functional capability of the device 14 as a result of the partially operational mode 34. For example, a communication capability may be limited, such as limiting the duration of a long-distance call, the duration of an out-of-carrier call, the size of a data download, the type of data to be download (e.g., audio, video, etc.), the connection to a WiFi hotspot, the connection to a Bluetooth device, the connection to a telecommunication carrier, and so on, or combinations thereof. The device usage capability may be limited, for example, by limiting access to an application (e.g., social media applications, electronic mail applications, etc.), to a file (e.g., music files, image files, video files, contact lists, etc.), to a web site, to a bookmark, to a favorite, to a text message, to a voice mail, to a calendar, and so on, or combinations thereof. The partially operational mode 34 may, in another example, include not limiting any functional capability, may include enhanced data collection and/or processing (e.g., more frequent sampling window, more types of suspicious activities to be included, additional threshold values, etc.), and so on, or combinations thereof. Accordingly, there may be multiple varying modes of partial operation, such as a range of levels from a level 1 partially operational mode (e.g., least relatively limited partially operational mode) to a level 10 partially operational mode (e.g., most relatively limited partially operational mode) including varying degrees of limit to the communication capability, the device usage capability, enhanced data collection and/or processing, and so on, or combinations thereof.

A suspicion trigger 36 is encountered in the illustrated example. The suspicion trigger 36 includes a departure risk value to cause the accumulation value 24 to depart from a suspicious condition value six (6) (e.g., in a direction away from any value in the safe condition value range) to a compromised condition value fourteen (14). The magnitude of the departure may be predetermined (e.g., configured, preset, etc.), may be based on a severity ascribed to the suspicion trigger 36, and so on, or combinations thereof. For example, the threat risk value associated with the suspicion trigger 36 is a positive integer value eight (8) in the illustrated example, which may be predetermined for the suspicion trigger 36 to indicate highly severe security activity (e.g., a different finger print pattern, a different facial recognition pattern, etc.). Accordingly, the threat risk value associated with the suspicion trigger 36 may be added to the accumulation value 24, which causes the accumulation value 24 to depart from the suspicion condition value six (6) to the compromised condition value fourteen (14). In addition, the counter maintaining the accumulation value 24 may be updated to read fourteen (14).

The threat condition for the device 14 may be established based on the accumulation value 24. In the illustrated example, the threat condition may be established as the compromised condition, wherein a transition across the threshold value 28 is determined based on the accumulation value 24. For example, a transition across the threshold value 28 may be determined based on the change in value of the accumulation value 24, based on the final total value of the accumulation value 24, based on the appearance of the accumulation value 24 in the compromised condition value region, and so on, or combinations thereof. In the illustrated example, the threat condition is established as the compromised condition since the accumulation value 24 has crossed the threshold value 28 and remains in the compromised condition value region. The compromised threat condition may indicate, for example, that the device 14 may be perceived to be at a relatively high risk of being compromised, such as hacked, lost, stolen, and so on, or combinations thereof.

The compromised threat condition may be managed by defining an operational mode for the device 14 in response to the suspicious threat condition. For example, a security action may be performed to define the operational mode. The security action may include, for example, maintaining the current operational mode, modulating the current operational mode, and so on, or combinations thereof. In the illustrate example, the operational mode is defined as a fully inoperable mode 38. In one example, the partially operational mode 34 may be modulated (e.g., changed) to the fully inoperable mode 38 since the accumulation value 24 transitions across the threshold value 28 to establish the compromised threat condition.

There may be a suspension of a functional capability of the device 14 as a result of the fully inoperable mode 38. For example, a communication capability may be suspended, such as restricting a long-distance call, an out-of-carrier call, a data download, a connections to a WiFi hotspot, a connection to a Bluetooth device, a connection to a telecommunication carrier, and so on, or combinations thereof. The device usage capability may be suspended, for example, by restricting access to an application (e.g., social media applications, electronic mail applications, etc.), to a file (e.g., music files, image files, video files, contact lists, etc.), to a web site, to a bookmark, to a favorite, to a text message, to a voice mail, to a calendar, and so on, or combinations thereof. The fully inoperable mode 38 may include enhanced data collection and/or processing (e.g., more frequent sampling window, more types of suspicious activities to be included, additional threshold values, etc.), and so on, or combinations thereof.

It should be understood that a threat condition may be managed by a security action involving any action. The security action may include notifying another device (e.g., of the owner, etc.) about the threat condition of the device 14 via an alert. The alert may include, for example, an electronic mail alert, a text message alert, an instant message alert, a telephone call, an image alert, and so on, or combinations thereof. In one example, a mode-less action (e.g., an action which may not define and/or change an operational mode) may be performed when the threshold value 26 is crossed in any direction (e.g., in a forward direction, a backward direction, etc.), such as forwarding the alert (e.g., a notification such as a phone message, a photo taken of the current user, etc.) to a home telephone of the owner of the device 14, a desktop personal computer of the owner of the device 14, a remote log (e.g., an external log service), and so on, or combinations thereof. The alert may be forwarded to any further device, such as a device of a friend of the owner, a family member of the owner, a coworker of the owner, a superior of the owner, based on a status such as "next of kin", and so on, or combinations thereof.

The destination of the alert may be based on, for example, a list of contacts, a list of social media friends, a calendar, a relationship with the owner of the device 14, and so on, or combinations thereof. For example, the alert may be forwarded to a device of an individual expected to currently be with the owner based on the calendar, based on frequent communications with the individual, and so on, or combinations thereof. The owner may instruct the device 14 to enter and/or remain in a lockdown mode, for example, when the device 14 is lost and/or stolen (e.g., a compromised condition) in response to the alert. The security action may also include, for example, awaiting for another trigger before taking a further action, such awaiting for another suspicious trigger, another calming trigger, and so on, or combinations thereof. The security action may involve, for example, prompting the owner for a calming trigger, such as authentication data (e.g., password, finger print, etc.).

A calming trigger 40 is encountered in the illustrated example. In one example, no request of a security check and/or no prompt may be required for the generation and/or implementation of the calming trigger 40. For example, the calming trigger may be automatically generated and/or implemented when a password is identified, when a facial match is identified, when a finger print match is identified, when a palm print match is identified, when a voice match is identified, when a secure operation is identified, and so on, or combinations thereof. The secure operation may include, for example, a secure (e.g., authenticated) instruction to ignore a suspicion trigger, to lower a disappearance time for the suspicion trigger, to modify a threshold value, to reset an accumulation value, to delete a log for a trigger, to add a new usage pattern, and so on, or combinations thereof. The calming trigger may also be automatically generated and/or implemented when the owner reverts back to an established pattern, such as the established geospatial travel pattern, the established geospatial location, the established application pattern, and so on, or combinations thereof.

The calming trigger 40 includes a reversion risk value to cause the accumulation value 24 to revert towards a safe condition value (e.g., to the value zero, to a value in the safe condition value region, to a value in the suspicious condition value region, to a value in the compromised condition value region closer to a safe condition value, etc.) from the compromised condition value fourteen (14). The magnitude of the departure may be predetermined (e.g., configured, preset, etc.), may be based on a severity ascribed to the calming trigger 40, and so on, or combinations thereof. For example, the threat risk value associated with the calming trigger 40 is a negative integer value eleven (11) in the illustrated example, which may be predetermined for the calming trigger 40 to indicate highly severe calming activity (e.g., a finger print pattern match, a facial recognition pattern match, etc.). Accordingly, the threat risk value associated with the calming trigger 40 may be added to the accumulation value 24, which causes the accumulation value 24 to revert to the safe condition value three (3) from the compromised condition value fourteen (14). In addition, the counter maintaining the accumulation value 24 may be updated to read three (3). Accordingly, a single trigger, such as the calming trigger 40, may be sufficient to cross a threshold, such as the thresholds values 26, 28.

The threat condition for the device 14 may be established based on the accumulation value 24. In the illustrated example, the threat condition may be established as the safe condition, wherein a transition across the threshold values 26, 28 is determined based on the accumulation value 24. For example, a transition across the threshold values 26, 28 may be determined based on the change in value of the accumulation value 24, based on the final total value of the accumulation value 24, based on the appearance of the accumulation value 24 in the safe condition value region, and so on, or combinations thereof. In the illustrated example, the threat condition is established as the safe condition since the accumulation value 24 has crossed the threshold values 26, 28 and remains in the safe condition value region. The safe condition may indicate, for example, that the device 14 may be perceived to be at a relatively low risk of being compromised, such as hacked, lost, stolen, and so on, or combinations thereof.

The safe threat condition may be managed by defining an operational mode for the device 14 in response to the safe threat condition. For example, a security action may be performed to define the operational mode. The security action may include, for example, maintaining the current operational mode, modulating the current operational mode, and so on, or combinations thereof. In the illustrate example, the operational mode is defined as the fully operational mode 20. In one example, the fully inoperable mode 38 may be modulated (e.g., changed) to the fully operable mode 20 since the accumulation value 24 transitions across the threshold values 28, 26 to establish the safe threat condition. Accordingly, even though the accumulation value 24 may not be reset to the value zero (0), the current user of the device 14 may still leverage the full functional capability of the device 14.

It should be understood that a trigger may be used to set an accumulation value directly to any value independent of its previous value. In one example, the calming trigger 40 may set the accumulation value 24 directly to, and/or independently of a previous value of the accumulation value 24, the integer value zero (0) (e.g., a limit value, a minimized value, a maximized value, etc.), for example when a secret PIN number operates as a threat reset and is encountered. Accordingly, entering a predetermined PIN number may calm the device 14 independently of its previous state and/or mode. In another example, the suspicion trigger 32 may set the accumulation value 24 directly to, and/or independently of a previous value of the accumulation value 24, the integer value fifteen (15) (e.g., a limit value, a minimized value, a maximized value, etc.), for example when a fingerprint mismatch indicates an extremely serious threat and is encountered. In addition, one or more security actions (e.g., all actions) associated with one or more threshold values (e.g., all thresholds) crossed may be implemented during the transition.

In addition, it should be understood that a trigger may be associated with a time value, which in order for the trigger to have an effect, the trigger may persist (e.g., occur) for a time duration (e.g., a predetermined time duration). In one example, a suspicion trigger and/or a calming trigger may occur for a time duration (e.g., including a value of seconds, minutes, days, etc.) in order for the trigger to have an effect (e.g., add points, subtract points, jump directly to a threat condition, set an accumulation value to a particular value such as a limit value, cause a security action, etc.). In another example, a suspicion trigger may disappear for a time duration to prove stability instead of having an immediate calming effect without stability. For example, a GPS location may indicate for at least thirty minutes that the device 14 is in a normal area/path in which the device 14 usually travels before a calming trigger (e.g., the absence of the suspicion trigger for the time period, the appearance of the calming trigger for the time period, etc.) may be used to subtract points from the accumulation value 24.

A user interface (e.g., a graphical user interface, a command line interface, etc.) may be utilized to access one or more configurable settings to manage a threat condition. The settings may include options for a sensor (e.g., a camera, a touchscreen, etc.), for an operational mode (e.g., fully operational, fully inoperable, etc.), for a risk assessment tool (e.g., a table, a graph, etc.), for a trigger (e.g., suspicion triggers, calming, triggers, etc.), for a pattern (e.g., recognition patterns, geospatial travel patterns, communication patterns, etc.), for a threat risk value (e.g., relative, numerical, etc.), for an aggregation (e.g., sum, multiplication, etc.), for a risk value adjustment and/or modification (e.g., correlations, weight factors, etc.), for a threshold value (e.g., relative, numerical, etc.), for a risk profile (e.g., device, usage context, usage location, etc.), for a threat condition (e.g., relative, numerical, ranges, cross thresholds, value of the accumulation value, etc.), for a functional capability (e.g., limits, suspension, no limits, etc.), for a security action (e.g., define operational mode, alert, etc.), to prompt (e.g., request password, etc.), and so on, or combinations thereof. In one example, the owner may iteratively set the operational mode of the device 14 to be the fully operational mode 20 by resetting the accumulation value 24 via the user interface when a friend is utilizing the device 14, by changing (e.g., modifying, suspending, etc.) the threshold values 26, 28 via the user interface, by forcing the operational mode to be the fully operational mode 20, and so on, or combinations thereof.

Figure 2:
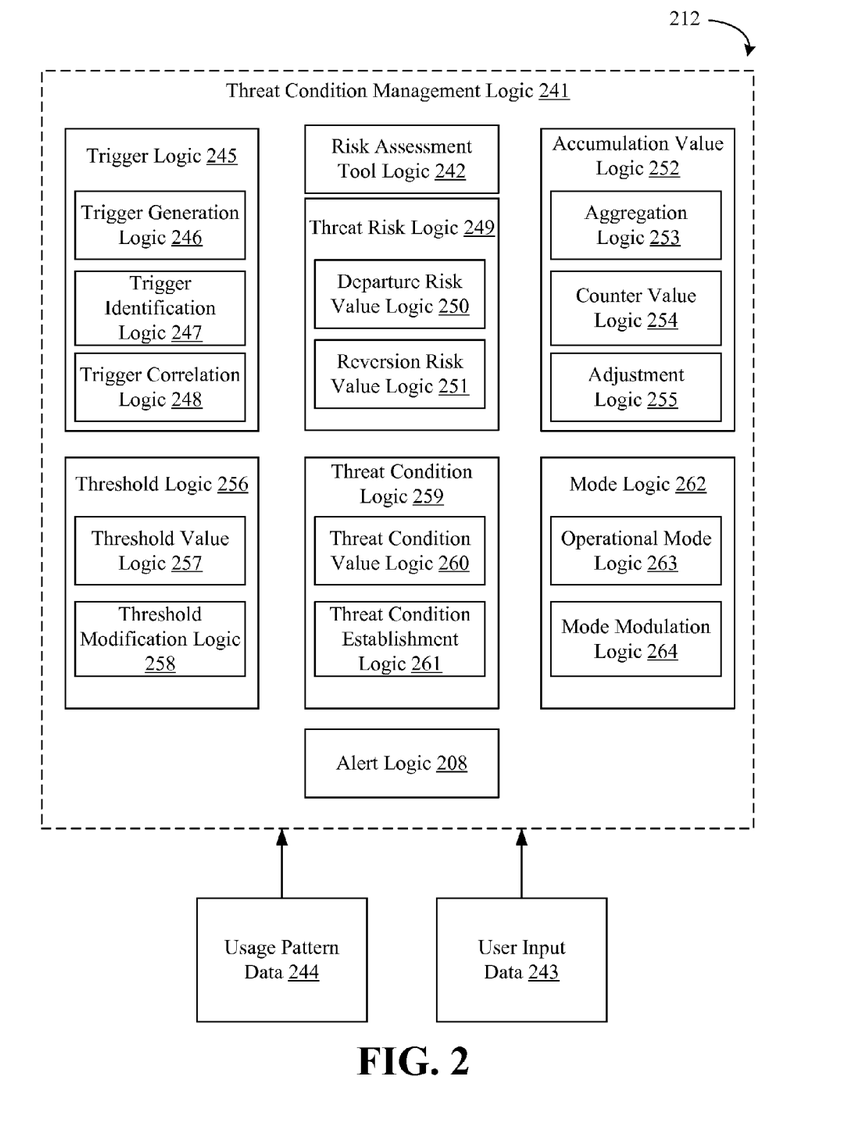
FIG. 2 is a block diagram of an example of an architecture including logic to manage a threat condition according to an embodiment.

FIG. 2 shows a logic architecture 212 to manage a threat condition according to an embodiment. In the illustrated example, the logic architecture 212 includes a threat condition management logic 241. The illustrated threat condition management logic 241 includes a risk assessment tool logic 242, which may define a tool to be utilized to assess risk for a device, such as a mobile computing platform. In one example, the risk assessment logic 242 may define a database table including any element described herein in any arrangement (e.g., combinations, locations, etc.). For example, a row and/or a column of the table may specify a trigger, a threat risk value, an accumulation value, a threshold value, a threat condition, an operational capability, a correlation, a security action, and so on, or combinations thereof. In another example, the risk assessment logic 242 may define a scale, such as a one-dimensional Cartesian coordinate scale, a two-dimensional Cartesian coordinate scale, a three-dimensional Cartesian coordinate scale, a Polar coordinate scale, and so on, or combinations thereof. The tool may be stored in data storage.

In addition, the tool may be modified. In one example, the tool may be modified in response to user input data 243 including a setting for a trigger, a threat risk value, a threshold value, a threat condition, an operational mode, and so on, or combinations thereof. Accordingly, the user input data 243 may be utilized to preset one or more of a trigger from the plurality of triggers, a threat risk value to be associated with the trigger, a threat condition for the device, a threshold value to be associated with the threat condition, a security action to be associated with the threshold value, and so on, or combinations thereof. The tool (e.g., table, scale, etc.) may also be modified utilizing a counter to update elements (e.g., an accumulation value, etc.) thereof.

The illustrated threat condition management logic 241 includes a trigger logic 245. In the illustrated example, the trigger logic 245 includes a trigger generation logic 246, which may generate a plurality of triggers over a period of time. For example, the illustrated trigger generation logic 246 may generate a suspicion trigger, a calming trigger, and so on, or combinations thereof. The suspicion trigger may indicate suspicious activity for the device. In one example, the suspicion trigger may be generated in response to a departure from an established usage pattern. The established usage pattern (and/or a pattern of interest such as a current usage pattern, a usage pattern sampled at a period of time of interest, etc.) may be determined utilizing pattern data 244, which may include data from data storage, from a sensor, and so on, or combinations thereof. The established usage pattern (and/or the pattern of interest) may include one or more of a geospatial travel pattern, a geospatial location pattern, a device handling pattern, a communication pattern, a short message service pattern, a finger print pattern, a palm print pattern, an application pattern, a music pattern, and so on, or combinations thereof.

The calming trigger may indicate calming activity for the device. The calming trigger may be generated based on an encounter of the calming activity, such as in response to a reversion towards the established pattern. For example, the calming trigger may be generated when the device is located in an established geolocation, when the device is traveling in an established travel pattern, when the device is held by the owner, when the owner responds to a prompt with correct information, and so on, or combinations thereof. The calming trigger may also be based on a disappearance of the suspicion trigger. The suspicion trigger may, for example, be implemented as the calming trigger if the suspicion trigger disappears for a preset amount of time to indicate stability for the device. The plurality of triggers may be generated and/or implemented silently, synchronously, noninvasively, unintrusively (as desired), and so on, or combinations thereof.

In the illustrated example, the trigger logic 245 includes a trigger identification logic 247, which may identify a plurality of triggers over a period of time. For example, the illustrated trigger identification logic 247 may identify the suspicion trigger, the calming trigger, and so on, or combinations thereof. The period of time may include any period of time, such as seconds, minutes, hours, days, weeks, months, years, and so on, or combinations thereof. In the illustrated example, the trigger logic 245 includes a trigger correlation logic 248, which may determine a correlation among two or more of the triggers. For example, the illustrated trigger correlation logic 248 may determine that two or more triggers correlate in temporal scope, in geographic scope, in usage scope, in recognition scope, in type scope, and so on, or combinations thereof. It should be understood that the trigger logic 245 may be set and/or modified in response to the user input data 243 (e.g., via a user interface), which may include instructions involving the trigger logic 245.

The illustrated threat condition management logic 241 includes a threat risk logic 249. The illustrated threat risk logic 249 may define a threat risk value to be associated with a trigger, such as a relative threat risk value, a numerical threat risk value, and so on, or combinations thereof. In one example, each trigger in the plurality of triggers may be associated with a corresponding threat risk value. In the illustrated example, the threat risk value logic 249 includes a departure risk value logic 250, which may define a value causing an accumulation value to depart from a safe condition value. In the illustrated example, the threat risk value logic 249 includes a reversion risk value logic 251, which may define a value causing an accumulation value to revert towards the safe condition value. It should be understood that the threat risk logic 249 may be set and/or modified in response to the user input data 243 (e.g., via a user interface), which may include instructions involving the threat risk logic 249.

The illustrated threat condition management logic 241 includes an accumulation value logic 252. The illustrated accumulation value logic 252 may determine an accumulation value, such as a relative accumulation value, a numerical accumulation value, and so on, or combinations thereof. In the illustrated example, the accumulation value logic 252 includes an aggregation logic 253, which may aggregate each of the threat risk values over the period of time. In one example, the aggregation may include a sum, an average, a mean, a maximum, a minimum, first, last, standard deviations, and so on, or combinations thereof. In the illustrated example, the accumulation value logic 252 includes a counter logic 254, which may manage a counter for the accumulation value. The counter may be maintained, for example, in data storage, data memory, and so on, or combinations thereof. The counter value logic 254 may manage the stored counter by providing a pointer to the counter, by providing access to the counter, by reading the counter, by writing to the counter, by resetting the counter to a lower limit value (e.g., a boundary value), by setting the counter to an upper limit value (e.g., a boundary value), and so on, or combinations thereof.

In the illustrated example, the accumulation value logic 252 includes an adjustment logic 255, which may adjust the accumulation value. In one example, the adjustment logic 255 may adjust the accumulation value by implementing the threat risk values. For example, the adjustment logic 255 may adjust the accumulation value based on the departure risk value which causes the accumulation value to depart from the safe condition value. The adjustment logic 255 may also adjust the accumulation value based on the reversion risk value which causes the accumulation value to revert towards the safe condition value. The adjustment logic 255 may adjust the accumulation value independently of a previous value of the accumulation value. For example, the adjustment logic 255 may adjust the accumulation value directly to, and/or independently of a previous value of the accumulation value, a lower limit value (e.g., a boundary), an upper limit value (e.g., a boundary), and so on, or combinations thereof.

In another example, the adjustment logic 255 may adjust the accumulation value based on a weight factor. For example, the weight factor may be based on the correlation determined by the trigger correlation logic 248, which may be implemented to adjust the accumulation value by multiplication, division, squaring, cubing, taking a square root, taking a logarithm, and so on, or combinations thereof. Accordingly, a trigger may be implemented based on a presence thereof, based on a value thereof, and so on, or combinations thereof. It should be understood that the accumulation value logic 252 may be set and/or modified in response to the user input data 243 (e.g., via a user interface), which may include instructions involving the accumulation value logic 252.

The illustrated threat condition management logic 241 includes a threshold logic 256. The illustrated threshold logic 256 includes a threshold value logic 257, which may define a set of progressive threshold values, such as a relative accumulation value, a numerical accumulation value, and so on, or combinations thereof. The illustrated threshold value logic 257 may define a set of threshold values including the same units (e.g., points), a set of threshold values which are graduated, a set of threshold values which are hierarchical, a set of threshold values which are successive, and so on, or combinations thereof. In one example, the threshold value logic 257 may define a moderate threshold value, an elevated threshold value, and so on, or combinations thereof. The threshold values may be defined based on, for example, the format of the tool defined by the risk assessment tool logic 242. Accordingly, the moderate threshold value may include the positive integer value five (5) and the elevated threshold values may include the positive integer value ten (10) when the risk assessment tool logic 242 defines a one-dimensional Cartesian coordinate scale having an increasing security risk in one axis starting at the value zero (0) and ending at the value fifteen (15).

The illustrated threshold logic 256 includes a threshold modification logic 258, which may modify one or more of the threshold values. The illustrated threshold modification logic 258 may modify one or more of the threshold values based on a risk profile, which may account for a device to be used, a usage context, a usage location, and so on, or combinations thereof. In addition, the threshold logic 256 may be set and/or modified in response to the user input data 243 (e.g., via a user interface), such as instructions involving the threshold logic 256. For example, the illustrated threshold modification logic 258 may modify one or more of the threshold values based on the user input data 243 including instructions to increase the threshold values, decrease the threshold values, delete the threshold values, suspend the threshold values, and so on, or combinations thereof. In one example, the threshold values may be associated with a set of threat conditions.

The illustrated threat condition management logic 241 includes a threat condition logic 259. The illustrated threat condition logic 259 includes a threat condition value logic 260, which may define a set of progressive threat condition values, such as a relative threat condition value, a numerical threat condition value, and so on, or combinations thereof. The illustrated threat condition value logic 260 may define a set of threat condition values including the same units (e.g., points), a set of threat condition values which are graduated, a set of threat condition values which are hierarchical, a set of threat condition values which are successive, and so on, or combinations thereof. In one example, the threshold value logic 260 may define a safe condition value region to indicate a safe condition, a suspicious condition value region to indicate a suspicious condition, a compromised condition value region to indicate a compromised condition, and so on, or combinations thereof. Accordingly, a moderate threshold value may separate the safe condition value region and the suspicious condition value region, and an elevated threshold value may separate the suspicious condition value region and one or more of a lost condition value region and a stolen condition value region. The threat condition values may be defined based on, for example, the format of the tool defined by the risk assessment tool logic 242.

The illustrated threat condition logic 259 includes a threat condition establishment logic 261, which may establish the threat condition based on the accumulation value. In one example, the illustrated threat condition establishment logic 261 may determine a transition across one or more of the threshold values based on the accumulation value to establish the threat condition. For example, the threat condition establishment logic 261 may establish an absence and/or a presence of a transition across a threshold value based on a change in value of the accumulation value, based on a final total value of the accumulation value, based on an appearance of the accumulation value in a threat condition value region, and so on, or combinations thereof. In one example, the threat condition establishment logic 261 may establish a suspicious threat condition when there has been a transition of the accumulation value across the moderate threshold value from the safe condition value region to the suspicious condition value region, when the accumulation value appears in the safe condition value regions, and so on, or combinations thereof. It should be understood that the threat condition logic 259 may be set and/or modified in response to the user input data 243 (e.g., via a user interface), which may include instructions involving the threat condition logic 259.

The illustrated threat condition management logic 241 includes a mode logic 262. The illustrated mode logic 262 includes an operational mode logic 263, which may define an operational mode such as a fully operational mode, a partially operational mode, a fully inoperable mode, and so on, or combinations thereof. The fully operational mode may define that no functional capability of a device is to be limited, suspended, and so on, or combinations thereof. For example, a current user may utilize the device to leverage the full functional capabilities of the device. The partially operational mode may define that there may be a limit on a functional capability of a device. In one example, a communication capability may be limited, a device usage capability may be limited, and so on, or combinations thereof. The partially operational mode may define that there may be no limit on a functional capability of a device, that there may be enhanced data collection and/or processing (e.g., more frequent sampling window, more types of suspicious activities to be included, additional threshold values, etc.), and so on, or combinations thereof. The fully inoperable mode may define that there may be a limit and/or a suspension on a functional capability of a device. In one example, the communication capability may be suspended (e.g., totally restricted, totally blocked, etc.), the device usage capability may be suspended, and so on, or combinations thereof. In addition, the fully inoperable mode may define that there may be enhanced data collection and/or processing (e.g., more frequent sampling window, more types of suspicious activities to be included, additional threshold values, etc.), and so on, or combinations thereof.

In the illustrated example, the mode logic 262 includes a mode modulation logic 264, which may modulate the operational mode of the device to manage the threat condition. For example, the illustrated mode modulation logic 264 may implement a security action, such as maintaining the current operational mode, modulating the current operational mode, and so on, or combinations thereof. In one example, the mode modulation logic 264 may maintain a current operational mode when the threshold value is not crossed, when the threshold value is crossed (e.g., a moderate threshold value crossed, etc.), and so on, or combinations thereof. Maintaining the current operational mode may include a security action of awaiting for another trigger before taking a further action, such as awaiting for another suspicious trigger, another calming trigger, and so on, or combinations thereof.

In another example, the mode modulation logic 264 may modulate (e.g., change) a current operational mode when a threshold value is not crossed (e.g., increases in value along a scale without a threshold cross, etc.), may modulate the current operational mode when the threshold value is crossed, and so on, or combinations thereof. It should be understood that crossing the threshold value may include reaching the threshold value, passing the threshold value, and so on, or combinations thereof. Accordingly, mode logic 264 may automatically lock the device and/or disable one or more capabilities of a device, for example, via the partially operational mode and/or the fully inoperable more when a threshold value is crossed, may await for further triggers via the fully operational mode when a threshold value is not crossed, and so on, or combinations thereof. The mode logic 262 may be set and/or modified in response to the user input data 243 (e.g., via a user interface), which may include instructions involving the mode logic 262.

The illustrated threat condition management logic 241 includes an alert logic 208. The alert logic 208 may notify another device (e.g., of the owner) about the threat condition. The alert logic 208 may generate an alert including an electronic mail alert, a text message alert, an instant message alert, a telephone call, an image alert, and so on, or combinations thereof. In addition, the alert logic 208 may determine the destination of the alert based on, for example, a list of contacts, a list of social media friends, a calendar, and so on, or combinations thereof. The alert logic 208 may prompt the owner for data, such as a calming trigger including authentication data (e.g., password, finger print, etc.), and so on, or combinations thereof. The alert logic 208 may be set and/or modified in response to the user input data 243 (e.g., via a user interface), which may include instructions involving the alert logic 208.

Figure 3:
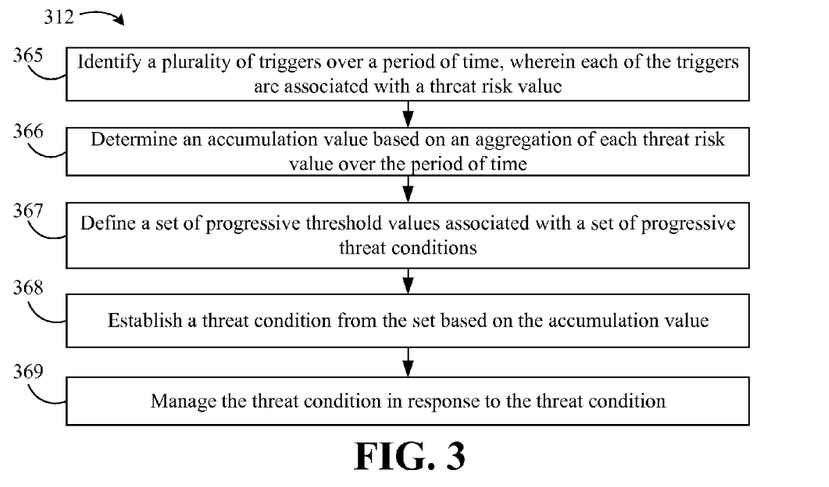
FIG. 3 is a flowchart of an example of a method to manage a threat condition according to an embodiment.

FIG. 3 shows a method 312 to manage a threat condition according to an embodiment. Illustrated processing block 365 provides for identifying a plurality of triggers over a period of time, wherein each of the triggers are associated with a threat risk value. In one example, the plurality of triggers may include a suspicion trigger to indicate suspicious activity for a device and/or a calming trigger to indicate calming activity for the device. Thus, identifying the plurality of triggers at the block 365 may correspond to, for example, identifying the plurality of triggers (e.g., FIG. 1 and FIG. 2) already discussed. Illustrated processing block 366 provides for determining an accumulation value based on an aggregation of each threat risk value over the period of time. In one example, the threat risk value may include a departure risk value causing the accumulation value to depart from a safe condition value stored in a counter and/or a reversion risk value causing the accumulation value to revert towards the safe condition value stored in the counter. Thus, determining the accumulation value at the block 366 may correspond to, for example, determining the accumulation value (e.g., FIG. 1 and FIG. 2) already discussed.

Illustrated processing block 367 provides for defining a set of progressive threshold values associated with a set of progressive threat conditions. In one example, a threshold value from the set of threshold values may include a moderate threshold value and/or an elevated threshold value. In another example, a threshold condition from the set of threat conditions may include a safe condition, a suspicious condition, and/or a compromised condition (e.g., a lost condition, a stolen condition, etc.). Thus, defining the set of progressive threshold value associated with the set of progressive threat conditions at the block 367 may correspond to, for example, defining the set of progressive threshold value associated with the set of progressive threat conditions (e.g., FIG. 1 and FIG. 2) already discussed. Illustrated processing block 368 provides for establishing a threat condition from the set of threat conditions based on the accumulation value. In one example, a transition across the threshold value from the set by the accumulation value may be determined to establish the threat condition. Thus, establishing a threat condition from the set of threat conditions at the block 368 may correspond to, for example, establishing a threat condition from the set of threat conditions (e.g., FIG. 1 and FIG. 2) already discussed.

Illustrated processing block 369 provides for managing the threat condition in response to the threat condition. In one example, a security action associated with a threshold value (and/or a threshold condition) may be performed. For example, a security action may involve sending an alert (e.g., a notification). In another example, a security action associated with a threshold value (and/or a threshold condition) may be performed to define the operational mode. For example, a current operational mode may be maintained when the threshold value is not crossed and/or the current operational mode may be modulated when the threshold value is crossed. In a further example, a transition across an elevated threshold value may be determined to establish the lost threat condition and/or the stolen threat condition based on the accumulation value, wherein the security action may include notifying another device of (e.g., of an owner of the device) about the threat condition, notifying a device of a friend of the owner about the threat condition, locking the device, disabling one or more capabilities of the device, awaiting for another trigger, and so on, or combinations thereof. Thus, managing the threat condition at the block 369 may correspond to, for example, managing the threat condition (e.g., FIG. 1 and FIG. 2) already discussed. It should be understood that the method 312 may include any further processing blocks as desired to manage a threat condition. For example, the method 312 may include a processing block to maintain a counter, to determine a correlation, to modify a threshold value, and so on, or combinations thereof.

Figure 4:
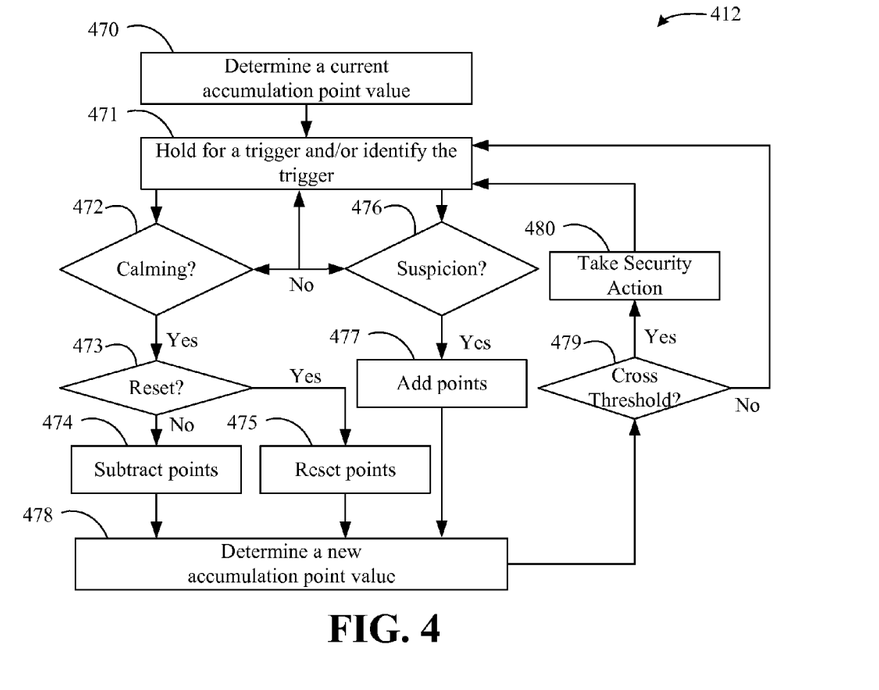
FIG. 4 is a flowchart of an example of a method to manage a threat condition according to an embodiment.

FIG. 4 shows a method 412 to manage a threat condition according to an embodiment. Illustrated processing block 470 may determine a current accumulation point value. In one example, the current accumulation point value may be zero (0) if the accumulation point value is reset, if no suspicion trigger has been identified and zero (0) is a strongest safe condition value, if a device is newly deployed, and so on, or combinations thereof. In another example, the current accumulation point value may be non-zero (e.g., a positive integer value, a negative integer value, etc.) if a trigger has been identified, if the non-zero value is set as an initial value, and so on, or combination thereof. Illustrated processing block 471 may hold for a trigger, such as suspicion trigger, a calming trigger, and so on, or combinations thereof. In addition, the illustrated processing block 471 may identify the trigger. A determination may be made at block 472 if a trigger is a calming trigger. If not, a determination may be made at block 476 if the trigger is a suspicion trigger and/or the process may proceed directly back to the block 471 from the block 472 to hold for another trigger. If the trigger is not a suspicion trigger, the process may proceed back to the block 471 from the block 476 to hold for another trigger. If the trigger is a calming trigger, a determination may be made at block 473 if the accumulation point value is to be reset back to an initial point value (e.g., zero). If the accumulation point value is not to be reset, illustrated processing block 474 may subtract points from the accumulation point value if the calming trigger includes a negative point value. If the accumulation point value is to be reset, illustrated processing block 475 may reset the accumulation point value.

Illustrated processing block 478 may determine a new accumulation point value. In one example, the new accumulation point value may remain zero (0) based on, for example, a format of a risk assessment tool (e.g., a one-dimensional Cartesian scale from safe condition value zero to compromised condition value fifteen, etc.). For example, the new accumulation point value may remain zero (0) if zero (0) is a lower limit value (e.g., a boundary) of the tool. In another example, the new accumulation point value may be a negative integer value based on, for example, the format of a risk assessment tool (e.g., a one-dimensional Cartesian scale including negative safe condition values, etc.). For example, the new accumulation point value may be a negative integer value if a lower limit value (e.g., a boundary) of the tool resides at a negative coordinate, position, angle, and so on, or combinations thereof.

A determination may be made at the block 476 if a trigger is a suspicion trigger. If not, a determination may be made at block 472 if the trigger is a calming trigger and/or the process may proceed directly back to the block 471 to hold for another trigger. If the trigger is not a calming trigger, the process may proceed back to the block 471 from the block 472 to hold for another trigger. If the trigger is a suspicion trigger, illustrated processing block 477 may add points to the accumulation point value if the suspicion trigger includes a positive point value. It should be understood that there may be a determination to set the accumulation point value to an upper limit value (e.g., a boundary) of the tool based on the presence of the suspicion trigger, the value of the suspicion trigger, and so on, or combinations thereof. The illustrated processing block 478 may determine the new accumulation point value. In one example, the new accumulation point value may be a positive integer value based on the format of a risk assessment tool (e.g., a one-dimensional Cartesian scale from zero to fifteen, etc.). For example, the new accumulation point value may be a positive integer value if the upper limit value (e.g., a boundary) of the tool resides at a positive coordinate, position, angle, and so on, or combinations thereof. It should be understood that causing opposite effects via the plurality of triggers (e.g., effects in opposite directions, in opposite signs, in opposite angles, etc.) may be valuable, and that the integer values described having opposite signs are for illustration purposes.

A determination may be made at block 479 if a threshold value is crossed. If not, the process may proceed back to the block 471 to hold for another trigger. If so, illustrated processing block 480 may take a security action. For example, the illustrated processing block 480 may maintain an operational mode, may modulate a current operation mode, may notify another device (e.g., of an owner) about the threat condition, may notify a device of a friend of the owner about the threat condition, may lock the device, may disable one or more capabilities of the device, may awaiting for another trigger, may prompt for data, may limit a functional capability of the device, may suspend a functional capability of the device, and so on, or combinations thereof. The method 412 may proceed back to the block 471 to hold for another trigger, wherein one or more aspects of the method 471 may be implemented silently, synchronously, noninvasively, unintrusively (as desired), and so on, or combinations thereof.

Figure 5:
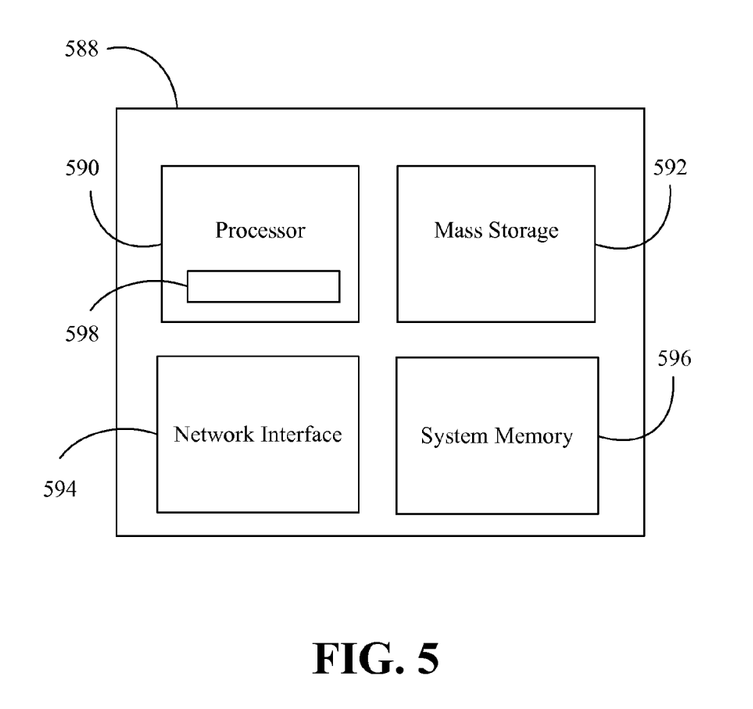
FIG. 5 is a block diagram of an example of a computing device according to an embodiment.

FIG. 5 shows a computing device 588 having a processor 590, mass storage 592 (e.g., read only memory/ROM, optical disk, flash memory), a network interface 594, and system memory 596 (e.g., random access memory/RAM). In the illustrated example, the processor 590 is configured to execute logic 598, wherein the logic 598 may implement one or more aspects of the scheme 12 (FIG. 1), the architecture 212 (FIG. 2), the method 312 (FIG. 3), and/or the method 412 (FIG. 4), already discussed. Thus, the logic 598 may manage a threat condition, including identifying a plurality of triggers over a period of time, defining a threat risk value, determining a correlation, determining an accumulation value, adjusting an accumulation value, defining a set of progressive threshold values, defining a set of progressive threat conditions, establishing a threat condition based on the accumulation value, defining an operational mode for a device, and so on, or combinations thereof. The logic 598 may also be implemented as a software application that is distributed among many computers (e.g., local or remote). Thus, while a single computer could provide the functionality described herein, systems implementing these features can use many interconnected computers (e.g., for scalability as well as modular implementation).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
    identifying a plurality of triggers over a period of time including a suspicion trigger to indicate suspicious activity for a device and a calming trigger to indicate calming activity for the device, wherein the suspicion trigger and the calming trigger are generated absent a security request and a security prompt, and wherein each of the triggers are associated with a threat risk value;
    determining an accumulation value based on an aggregation of each threat risk value over the period of time, wherein each threat risk value includes one of a departure risk value to cause the accumulation value to depart from a relatively more safe condition value based on the suspicion trigger and a reversion risk value to cause the accumulation value to revert towards a relatively more safe condition value based on the calming trigger;
    defining a set of progressive threshold values associated with a set of progressive threat conditions, wherein a threat condition from the set of progressive threat conditions is established for a device based on the accumulation value; and
    managing the threat condition by defining an operational mode for the device in response to the threat condition including:
        maintaining a current operational mode when the accumulation value based on the aggregation of each departure risk value and each reversion risk value does not cross a threshold value of the set of progressive threshold values; and
        modulating the current operational mode when the accumulation value based on the aggregation of each departure risk value and each reversion risk value crosses a threshold value of the set of progressive threshold values, wherein the current operational mode includes one or more of a fully operational mode, a partially operational mode, and a fully inoperable mode.

2. The method of claim 1, further including:
    determining a correlation among two or more of the triggers; and
    applying a weight factor to the accumulation value based on the correlation.

3. The method of claim 1, further including one or more of:
    determining a transition across a threshold value from the set of progressive threshold values by the accumulation value to establish the threat condition;
    modifying a threshold value from the set of progressive threshold values based on a risk profile, wherein the risk profile accounts for one or more of a device used, a usage context, and a usage location; and
    performing a security action to be associated with a threshold value.

4. The method of claim 1, further including one or more of:
    setting the accumulation value to be a limit value independently of a previous value of the accumulation value; and
    setting the accumulation value when a trigger persists for a time duration.

5. A computer program product comprising:
    a computer readable storage medium; and
    computer usable code stored on the computer readable storage medium, where, if executed by a processor, the computer usable code causes a computer to:
        identify a plurality of triggers over a period of time including a suspicion trigger to indicate suspicious activity for the device and a calming trigger to indicate calming activity for the device, wherein the suspicion trigger and the calming trigger are to be generated absent a security request and a security prompt, and wherein each of the triggers are to be associated with a threat risk value;
        determine an accumulation value based on an aggregation of each threat risk value over the period of time, wherein each threat risk value is to include one of a departure risk value to cause the accumulation value to depart from a relatively more safe condition value based on the suspicion trigger and a reversion risk value to cause the accumulation value to revert towards a relatively more safe condition value based on the calming trigger;
        define a set of progressive threshold values to be associated with a set of progressive threat conditions, wherein a threat condition from the set of progressive threat conditions is to be established for the device based on the accumulation value; and manage the threat condition, wherein an operational mode for a device is to be defined in response to the threat condition including to:
- maintain a current operational mode when the accumulation value based on the aggregation of each departure risk value and each reversion risk value is not to cross a threshold value of the set of progressive threshold values; and
- modulate the current operational mode when the accumulation value based on the aggregation of each departure risk value and each reversion risk value is to cross a threshold value of the set of progressive threshold values, wherein the current operational mode is to include one or more of a fully operational mode, a partially operational mode, and a fully inoperable mode.

6. The computer program product of claim 5, wherein the suspicion trigger is to be generated in response to a departure from an established usage pattern including one or more of a geospatial travel pattern, a geospatial location pattern, a device handling pattern, a communication pattern, a short message service pattern, a finger print pattern, and a palm print pattern, and wherein the calming trigger is to be generated in response to a reversion towards the established usage pattern.

7. The computer program product of claim 5, wherein the computer usable code, if executed, further causes a computer to maintain a counter for the accumulation value.

8. The computer program product of claim 5, wherein the computer usable code, if executed, further causes a computer to:
- determine a correlation among two or more of the triggers; and
- apply a weight factor to the accumulation value based on the correlation.

9. The computer program product of claim 5, wherein a threshold value from the set of progressive threshold values is to include one or more of a moderate threshold value and an elevated threshold value.

10. The computer program product of claim 9, wherein the moderate threshold value is to separate a safe condition value region and a suspicious condition value region, and wherein the elevated threshold value is to separate the suspicious condition value region and one or more of a lost condition value region and a stolen condition value region.

11. The computer program product of claim 5, wherein the computer usable code, if executed, further causes a computer to determine a transition across a threshold value from the set of progressive threshold values by the accumulation value to establish the threat condition.

12. The computer program product of claim 5, wherein the computer usable code, if executed, further causes a computer to modify a threshold value from the set of progressive threshold values based on a risk profile, wherein the risk profile is to account for one or more of a device to be used, a usage context, and a usage location.

13. The computer program product of claim 5, wherein the computer usable code, if executed, further causes a computer to perform a security action to be associated with a threshold value.

14. The computer program product of claim 13, wherein the computer usable code, if executed, further causes a computer to determine a transition across an elevated threshold value to establish one or more of a lost threat condition and a stolen threat condition based on the accumulation value, wherein the security action is to include one or more of notifying another device of an owner of the device about the threat condition, notifying a device of a friend of the owner about the threat condition, locking the device, disabling one or more capabilities of the device, and awaiting for another trigger.

15. The computer program product of claim 5, wherein the computer usable code, if executed, further causes a computer to utilize user input to preset one or more of a trigger from the plurality of triggers, a threat risk value to be associated with the trigger, a threat condition for the device, a threshold value to be associated with the threat condition, and a security action to be associated with the threshold value.

16. An apparatus comprising a processor to:
- identify a plurality of triggers over a period of time including a suspicion trigger to indicate suspicious activity for the device and a calming trigger to indicate calming activity for the device, wherein the suspicion trigger and the calming trigger are to be generated absent a security request and a security prompt, and wherein each of the triggers are to be associated with a threat risk value;
- determine an accumulation value based on an aggregation of each threat risk value over the period of time, wherein each threat risk value is to include one of a departure risk value to cause the accumulation value to depart from a relatively more safe condition value based on the suspicion trigger and a reversion risk value to cause the accumulation value to revert towards a relatively more safe condition value based on the calming trigger;
- define a set of progressive threshold values to be associated with a set of progressive threat conditions, wherein a threat condition from the set of progressive threat conditions is to be established for the device based on the accumulation value; and
- manage the threat condition, wherein an operational mode for a device is to be defined in response to the threat condition including to:
  - maintain a current operational mode when the accumulation value based on the aggregation of each departure risk value and each reversion risk value is not to cross a threshold value of the set of progressive threshold values; and
  - modulate the current operational mode when the accumulation value based on the aggregation of each departure risk value and each reversion risk value is to cross a threshold value of the set of progressive threshold values, wherein the current operational mode is to include one or more of a fully operational mode, a partially operational mode, and a fully inoperable mode.

* * * * *